(12) United States Patent
Grot et al.

(10) Patent No.: US 11,272,132 B2
(45) Date of Patent: Mar. 8, 2022

(54) TEMPORAL DIFFERENTIAL ACTIVE PIXEL SENSOR

(71) Applicant: Pacific Biosciences of California, Inc., Menlo Park, CA (US)

(72) Inventors: Annette Grot, Cupertino, CA (US); Stephen Turner, Eugene, OR (US); Steven Benjamin Warren, New York, NY (US)

(73) Assignee: Pacific Biosciences of California, Inc., Menlo Park, CA (US)

( * ) Notice: Subject to any disclaimer, the term of this patent is extended or adjusted under 35 U.S.C. 154(b) by 0 days.

(21) Appl. No.: 16/894,193

(22) Filed: Jun. 5, 2020

(65) Prior Publication Data

US 2020/0389616 A1 Dec. 10, 2020

Related U.S. Application Data

(60) Provisional application No. 62/858,896, filed on Jun. 7, 2019.

(51) Int. Cl.

| H04N 5/374 | (2011.01) |
|---|---|
| H04N 5/355 | (2011.01) |
| H04N 5/378 | (2011.01) |
| H01L 27/146 | (2006.01) |
| H04N 5/3745 | (2011.01) |

(52) U.S. Cl.
CPC ..... *H04N 5/37452* (2013.01); *H04N 5/37455* (2013.01)

(58) Field of Classification Search
CPC .......... H04N 5/37452; H04N 5/37455; H04N 5/378; H04N 5/374; H01I 27/1464; H01L 27/14609

USPC .... 348/300, 301, 302, 308, 294, 297, 229.1, 348/231.99, 231.1, 231.3; 257/291, 292, 257/443, 293; 250/208.1, 378; 341/126, 341/155
See application file for complete search history.

(56) References Cited

U.S. PATENT DOCUMENTS

| 5,631,704 A | 5/1997 | Dickinson et al. |
|---|---|---|
| 5,841,126 A | 11/1998 | Fossum et al. |
| 5,923,369 A | 7/1999 | Merrill et al. |
| 6,008,486 A | 12/1999 | Stam et al. |
| 6,201,572 B1 | 3/2001 | Chou |
| 6,563,540 B2 | 5/2003 | Trevino et al. |
| 6,753,904 B1 | 6/2004 | Nomura |
| 7,056,661 B2 | 6/2006 | Korlach et al. |

(Continued)

OTHER PUBLICATIONS

Aizawa, et al. "On Sensor Video Compression", IEEE Transactions on Circuits and Systems for Video Technology 7(3):543-548 • Jul. 1997.

(Continued)

*Primary Examiner* — Marly S Camargo
(74) *Attorney, Agent, or Firm* — Morgan, Lewis & Bockius LLP

(57) ABSTRACT

Provided are pixels, devices, systems, and methods relating to active pixel sensor in which each active pixel puts out a signal that represents a temporal differential. The output of the active pixel represents a comparison or difference between successive frames. The differential can represent the state of the sensor element in the pixel at the end of one frame compared to the state of the sensor element of the frame, at the end of the prior frame.

15 Claims, 11 Drawing Sheets

(56) References Cited

U.S. PATENT DOCUMENTS

| | | | |
|---|---|---|---|
| 7,148,462 B2* | 12/2006 | Bock | H01L 27/14643 |
| | | | 250/208.1 |
| 7,170,050 B2 | 1/2007 | Turner et al. | |
| 7,227,490 B2 | 6/2007 | Kawahito | |
| 7,989,860 B2 | 8/2011 | Park | |
| 8,367,813 B2 | 2/2013 | Korlach | |
| 8,467,061 B2 | 6/2013 | McCaffrey et al. | |
| 8,687,097 B2 | 4/2014 | Oike | |
| 8,961,757 B2 | 2/2015 | Nuckolls et al. | |
| 9,062,091 B2 | 6/2015 | Bjornson et al. | |
| 9,151,751 B2 | 10/2015 | Oldham et al. | |
| 9,157,864 B2 | 10/2015 | Fehr et al. | |
| 9,164,053 B2 | 10/2015 | Collins et al. | |
| 9,223,084 B2 | 12/2015 | Grot et al. | |
| 9,372,308 B1 | 6/2016 | Saxena et al. | |
| 9,410,891 B2 | 8/2016 | Fehr et al. | |
| 9,606,068 B2 | 3/2017 | Grot et al. | |
| 9,624,540 B2 | 4/2017 | Lundquist et al. | |
| 9,888,200 B2* | 2/2018 | Hsu | H04N 5/37452 |
| 9,957,291 B2 | 5/2018 | Sebo et al. | |
| 10,033,956 B2* | 7/2018 | Hsu | H04N 5/378 |
| 10,129,497 B2* | 11/2018 | Iwabuchi | H04N 5/378 |
| 10,190,158 B2 | 1/2019 | Turner et al. | |
| 2013/0021441 A1* | 1/2013 | Kim | H01L 27/14641 |
| | | | 348/46 |
| 2015/0171326 A1 | 6/2015 | Guo et al. | |
| 2016/0155768 A1* | 6/2016 | Yi | H01L 27/1463 |
| 2017/0024017 A1 | 1/2017 | Ajmera et al. | |
| 2017/0024049 A1 | 1/2017 | Tachikawa et al. | |
| 2018/0184019 A1* | 6/2018 | Gode | H04N 5/357 |
| 2018/0234652 A1* | 8/2018 | Sugawa | H04N 5/378 |
| 2019/0020839 A1* | 1/2019 | Velichko | H04N 5/378 |
| 2021/0028259 A1* | 1/2021 | Xu | H01L 27/3265 |

OTHER PUBLICATIONS

Chi, et al. "CMOS Camera With In-Pixel Temporal Change Detection and ADC", IEEE Journal of Solid-State Circuits, vol. 42, No. 10, Oct. 2007.

Choi, et al. "Single-Molecule Lysozyme Dynamics Monitored by an Electronic Circuit" Science 335, 319 (2012).

Duque-Carrillo, et al. "Control of the Common-Mode Component in CMOS Continuous-Time Fully Differential Signal Processing", Analog Integrated Circuits and Signal Processing 4, 131-140 (1993).

El-Desouki, et al. "CMOS Image Sensors for High Speed Applications", Sensors 2009, 9, 430-444; doi:10.3390/s90100430.

Fossum, E. R. in Proceedings of SPIE: Charge-Coupled Devices and Solid State Optical Sensors III, vol. 30, pp. 2-14 (1993).

Kang, et al. "High-performance electronics using dense, perfectly aligned arrays of single-walled carbon nanotubes" Nat Nano. 2007;2(4):230-6).

Keim, R. "The Basic MOSFET Differential Pair", Online—[retrieved Jun. 19, 2018] https://www.allaboutcircuits.com/technical-articles/the-basic-mosfet-differential-pair/, Jun. 9, 2016.

Köklü, et al. "A Switched Capacitor Fully Differential Correlated Double Sampling Circuit for CMOS Image Sensors," 5th International Symposium on Medical Information and Communication Technology, Mar. 27-30, 2011, U.S.

Meric, et al. "Hybrid carbon nanotube-silicon complementary metal oxide semiconductor circuits" Journal of Vacuum Science & Technology B. 2007;25(6):2577-80. doi: 10.1116/1.2800322.

Patolsky, et al., "Electrical Detection of Viruses," PNAS, 101(39), 14017, 2004.

Suat, et al. "Differential Mode CMOS Active Pixel Sensor (APS) for Optically Programmable Gate Array (OPGA)" Proceedings of SPIE—The International Society for Optical Engineering • Dec. 2002.

Takayanagi et al. "Recent Progress in High-Resolution and High-Speed CMOS Image Sensor Technology", Extended Abstracts of the 2009 International Conference on Solid State Devices and Materials, Sendai, 2009.

Zhang et al. "CMOS Image Sensor with On-Chip Image Compression: A Review and Performance Analysis" Journal of Sensors vol. 2010, Article ID 92069.

\* cited by examiner

TEMPORAL DIFFERENTIAL ACTIVE PIXEL SENSOR

CROSS-REFERENCE TO RELATED APPLICATION

This application claims priority to U.S. Provisional Patent Application No. 62/858,896 entitled "Temporal Differential Active Pixel Sensor," filed Jun. 7, 2019, which is hereby incorporated by reference.

STATEMENT REGARDING FEDERALLY SPONSORED RESEARCH

Not Applicable.

BACKGROUND OF THE INVENTION

Typical digital image capture systems such as digital cameras employ a sensor, memory and processor. Such sensors are manufactured using charge coupled device (CCD) or complimentary metal oxides (CMOS) semiconductor processes. A typical CMOS sensor includes a pixel array having a plurality of pixel cells arranged in rows and columns. A correlated double sampler (CDS), an amplifier, and an analog-to-digital converter are also typically included for every column of the pixel array. In a typical system, light intensities captured in each active pixel cell of the CMOS sensor are directly transferred to a respective CDS. Thereafter, the image data is provided to an amplifier for amplification. The amplified signal is provided to the analog-to-digital converter, which converts the analog signal into a digital signal. Once the image data is converted into digital form, it is often stored in a memory and/or transferred for further processing either locally within the image capture system or remotely within another image processing system, such as a computer.

Thus, the output from a single active pixel in the sensor represents the light intensity captured at that pixel during a frame. In some cases, further processing of the signal from a sensor includes providing a differential. The conversion of the signal to a differential is carried typically carried out outside of the pixel, and is typically performed digitally. There is a need for a sensor having active pixels in which provide a differential output, in particular, an output from the pixel that represents a differential between measured intensities between successive frames. This type of temporal active pixel sensor can also be useful for sensors generally, and not only light sensors.

BRIEF SUMMARY OF THE INVENTION

In some aspects, the present disclosure provides an active pixel sensor that provides a temporal differential output comprising: a plurality of pixels, each pixel comprising; one or more input lines to control pixel circuit timing and operation; an output line to send output signals; a sensor element for electrically measuring a property; a storage element A and a storage element B; circuitry for transferring the electrical state of the sensor element after a frame N to storage element A; and circuitry for transferring the electrical state of the sensor element after a frame N+1 to storage element B; circuitry for comparing the electrical state of the storage element B to the electrical state of storage element A after frame N+1; and circuitry for sending an output signal representing the comparison of the electrical state of the storage element B to the electrical state of storage element A after frame N+1, wherein the output signal represents a differential between electrical state of the sensor element after a frame N and the electrical state of the sensor element after a frame N+1.

In some embodiments the sensor comprises a CMOS sensor. In some embodiments the property comprises light. In some embodiments the property comprises pressure, temperature, position, vibration, humidity, chemical species, or a fluid property.

In some embodiments, the active pixel sensor further comprises circuitry for resetting storage element A and storage element B.

In some embodiments the circuitry for comparing electrical states comprises a differential amplifier. In some embodiments the output from the pixel is sent out a column to column circuitry.

The active pixel sensor of claim 7 wherein the column circuitry comprises an analog to digital converter.

In some aspects, the invention provides an active pixel CMOS sensor that provides a temporal differential output comprising: a plurality of pixels, each pixel comprising; one or more input lines to control pixel circuit timing and operation; an output line to send output signals; a photodiode for electrically measuring light; a storage element A and a storage element B, each storage element comprising a capacitor; circuitry for transferring the electrical state of the photodiode after a frame N to storage element A; and circuitry for transferring the electrical state of the photodiode after a frame N+1 to storage element B; circuitry for comparing the electrical state of the storage element B to the state of storage element A after frame N+1; and circuitry for sending an output signal representing the comparison of the electrical state of the storage element B to the electrical state of storage element A after frame N+1; wherein the output signal represents a differential between electrical state of the sensor element after a frame N and the electrical state of the sensor element after a frame N+1.

In some embodiments the electrical states of the sensor elements comprise voltages, and the differential that is output comprises a differential voltage.

In some embodiments further comprises circuitry for resetting storage element A and storage element B.

In some embodiments the circuitry for comparing electrical states comprises a differential amplifier.

In some aspects, the present disclosure provides a method of measuring properties with an active pixel sensor comprising: providing a sensor comprising a plurality of pixels, each pixel comprising; one or more input lines to control pixel circuit timing and operation; an output line to send output signals; a sensor element for measuring a property; a storage element A and a storage element B; exposing the sensor element to a property during frame N, the property altering the electrical state of the sensor element; transferring the electrical state of the sensor element at the end of frame N to storage element A; resetting the electrical state of the sensor element; exposing the sensor element to a property during frame N+1, the property altering the electrical state of the sensor element; transferring the electrical state of the sensor element at the end of frame N+1 to storage element B; comparing the electrical state of storage element B to the electrical state of storage element A at the end of frame N+1; and sending an output signal representing the comparison of the electrical state of the storage element B to the electrical state of storage element A at the end of frame N+1; wherein the output signal represents a differential between electrical state of the sensor element after a frame N and the electrical state of the sensor element after a frame N+1.

In some embodiments the sensor comprises a CMOS sensor. In some embodiments the property comprises light. In some embodiments the property comprises pressure, temperature, position, vibration, humidity, chemical species, or a fluid property.

In some embodiments the active pixel sensor further comprising circuitry for resetting storage element A and storage element B.

In some embodiments the circuitry for comparing electrical states comprises a differential amplifier. In some embodiments the output from the pixel is sent out a column to column circuitry. In some embodiments the column circuitry comprises an analog to digital converter. In some embodiments the sensor comprises a CMOS sensor.

In some aspects the invention provides a method of measuring light with a CMOS active pixel sensor comprising: providing a sensor comprising a plurality of pixels, each pixel comprising; one or more input lines to control pixel circuit timing and operation; an output line to send output signals; a photodiode for measuring a property; a storage element A and a storage element B, each storage element comprising a capacitor; exposing the photodiode to light during frame N, the property altering the electrical state of the photodiode; transferring the electrical state of the photodiode at the end of frame N to storage element A; resetting the electrical state of the photodiode; exposing the photodiode to light during frame N+1, the light altering the electrical state of the photodiode; transferring the electrical state of the photodiode at the end of frame N+1 to storage element B; comparing the electrical state of storage element B to the electrical state of storage element A at the end of frame N+1; and sending an output signal representing the comparison of the electrical state of the storage element B to the electrical state of storage element A at the end of frame N+1; wherein the output signal represents a differential between electrical state of the photodiode after a frame N and the electrical state of the photodiode after a frame N+1.

In some embodiments the active pixel sensor further comprises circuitry for resetting storage element A and storage element B.

In some embodiments the circuitry for comparing electrical states comprises a differential amplifier. In some embodiments the output from the pixel is sent out a column to column circuitry.

In some embodiments the column circuitry comprises an analog to digital converter.

In some embodiments, the methods comprise detecting the incorporation of fluorescently labeled nucleotides using an active pixel sensor of the invention.

Another aspect of the present disclosure provides an integrated active pixel circuit comprising a substrate, a positive supply voltage line ($V_{DD}$), a first reset line, a second reset line, a first signal line, a second signal line, a storage A control element in electrical communication with the positive supply voltage line and the first reset line, where an electrical property of the first reset line determines whether the storage A control element is in an electrically isolating or an electrically communicating state, a storage B control element in electrical communication with the positive supply voltage line and the second reset line, were an electrical property of the second reset line determines whether the storage B control element is in an electrically isolating or an electrically communicating state, and a plurality of pixels arranged on the substrate.

Each respective pixel in the plurality of pixels comprises a storage element A in electrical communication with the storage A control element, where the storage element A is reset when in electrical communication with the positive supply voltage line through the storage A control element when the storage A control element is in the electrically communicating state. Each respective pixel in the plurality of pixels further comprises a storage element B in electrical communication with the storage B control element, where the storage element B is reset when in electrical communication with the positive supply voltage line through the storage B control element when the storage B control element is in the electrically communicating state. Each respective pixel in the plurality of pixels further comprises a sensor that is reset when set to the voltage of the positive supply voltage line, wherein the sensor measures a property. Each respective pixel in the plurality of pixels further comprises a first sensor control element in electrical communication with (i) the storage A element and (ii) the first signal line, where an electrical property (e.g., voltage, current, etc.) of the first signal line determines whether the first sensor control element electrically isolates from the storage element A or electrically connects the sensor to the storage element A. Each respective pixel in the plurality of pixels further comprises a second sensor control element in electrical communication with (i) the storage B element and (ii) the second signal line, where an electrical property (e.g., voltage, current, etc.) of the second signal line determines whether the second sensor control element electrically isolates the sensor from the storage element B or electrically connects the sensor to the storage element B. Each respective pixel in the plurality of pixels further comprises a first output line (node A) in electrical communication with the storage element A and a second output line (node B) in electrical communication with the storage element B.

In some embodiments, the integrated active pixel circuit further comprises a controller that defines a plurality of sequential frame pairs. The controller is in electrical communication with the first reset line, the second reset line, the first signal line, and the second signal line.

For each first frame in a respective frame pair in the plurality of frame pairs, the controller sets the electrical property (e.g., voltage, current, etc.) of the first reset line so that the storage A control element is in the electrically isolating state, the controller sets the electrical property (voltage, current, etc.) of the first signal line so that the first sensor control element electrically connects the sensor to the storage element A, and the controller sets the electrical property (voltage, current, etc.) of the second signal line so that the second sensor control element electrically isolates the sensor from the storage element B.

For each second frame in a respective frame pair in the plurality of frame pairs, the controller sets the electrical property (voltage, current, etc.) of the second reset line so that the storage B control element is in the electrically isolating state, the controller sets the electrical property (voltage, current, etc.) of the first signal line so that the first sensor control element electrically isolates the sensor from the storage element A, and the controller sets the electrical property (voltage, current, etc.) of the second signal line so that the second sensor control element electrically connects the sensor to the storage element B.

In some embodiments, before each first frame the controller resets the sensor and the storage element A by setting the electrical property (voltage, current, etc.) of the first reset line so that the storage A control element is in the electrically communicating state and setting the electrical property (voltage, current, etc.) of the first signal line so that the first sensor control element electrically connects the sensor to the storage element A.

In some embodiments, before each second frame the controller resets the sensor and the storage element B by setting the electrical property (voltage, current, etc.) of the second reset line so that the storage B control element is in the electrically communicating state and setting the electrical property (voltage, current, etc.) of the second signal line so that the second sensor control element electrically connects the sensor to the storage element B.

In some embodiments, the integrated active pixel circuit, further comprises, for each pixel in the plurality of pixels, a signal comparator in electrical communication with the first and second output line, and a signal comparator output line that provides a differential comparison of the first and second output line.

In some embodiments, the sensor comprises a CMOS sensor. In some embodiments the property measured by the sensor comprises light impinging on the sensor.

In some embodiments, the property measured by the sensor comprises pressure, temperature, position, vibration, humidity, chemical species, or a fluid property.

In some embodiments, the signal comparator is a differential amplifier.

In some embodiments, the integrated active pixel circuit further comprises column circuitry in electrical communication with the signal comparator output line.

In some embodiments, the column circuitry comprises an analog to digital converter.

In some embodiments, the integrated active pixel circuit is CMOS, each sensor of each pixel is a photodiode; the measure property is light impinging on the respective sensor; each storage element A is a respective first capacitor; and each storage element B is a respective second capacitor.

In some embodiments, the sensor represents the light in the form of a voltage.

In some embodiments, the signal comparator provides to the signal comparator line a difference in voltage between the first and second output line.

In some embodiments, each pixel in the plurality of pixels includes a separate storage A control element and a storage B control element. In some alternative embodiments, the storage A control element and the storage B control element are external to the plurality of pixels.

DETAILED DESCRIPTION OF THE INVENTION

Figure 1:
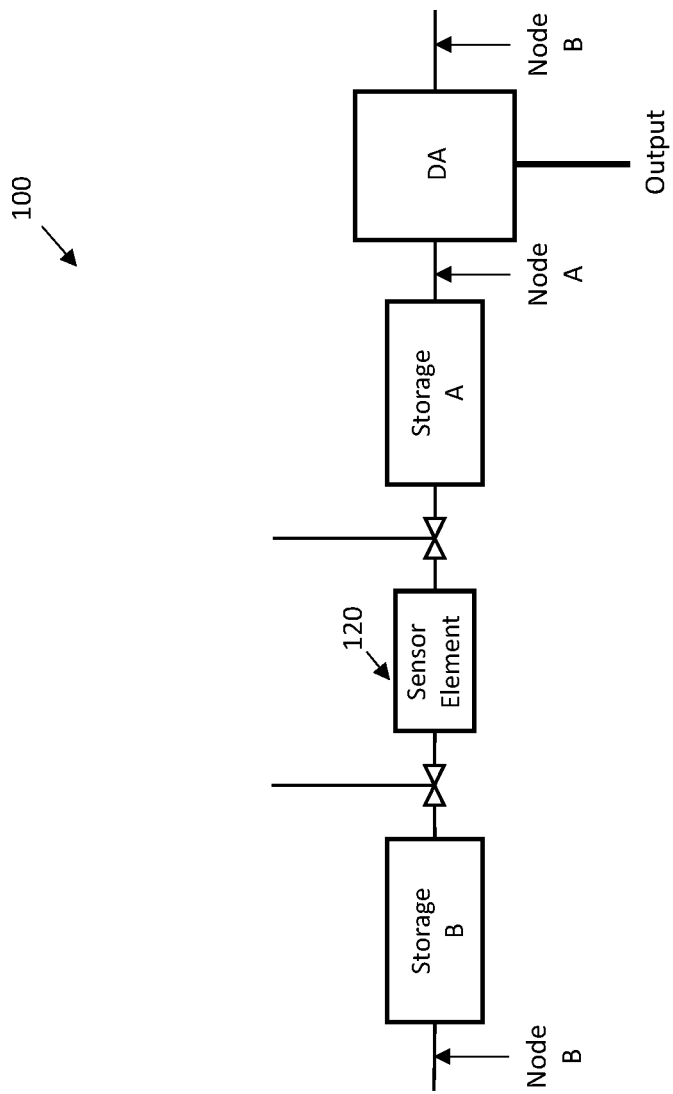
FIG. 1 shows an embodiment of the active pixel of the invention in the context of an active pixel sensor array having row and column architecture.

In some aspects, the present invention provides an active pixel sensor for which the output from each pixel represents a differential value of two measurements made during successive frames at the same pixel. A typical active pixel sensor outputs a signal after each frame that represents the absolute value of the measurement over that frame time. Having a differential value output at the end of each frame time can have significant advantages for some sensor applications. In some cases, the differential output can provide a more precise measure of the desired property. In some cases, the differential output can allow for a significant improvement in the dynamic range of the pixel output voltage, allowing, for example, more effective use of analog to digital circuits in downstream processing of the output signal. In some cases, the active pixel sensors of the invention are more robust to varying baseline levels in the signal.

A preferred embodiment of the invention is an active pixel sensor for sensing light. While embodiments described herein are described for pixels which sense light, for example, including a photodiode, it will be understood by those in the art that the active pixel sensors of the invention can be used for sensors other than light sensors. For example, the active pixel sensors of the invention can be used for sensing pressure, temperature, position, vibration, humidity, chemical species, or fluid properties. Additionally, the active pixel sensors of the invention can be used with any sensing modality that produces an electrical signal corresponding to the parameter of interest. In other cases, it can reduce the data bandwidth required to transport information from the sensor array to digital processing facilities located elsewhere. In some implementations there can be a useful reduction in the electrical power consumed, or heat generated. In certain implementations it can provide better time resolution on a desired signal by providing a difference between measurements that are closer in time to each other than would be possible with conventional sensor arrays.

The active pixel sensors of the invention are typically arrays of active pixels. The arrays of active pixels can be arranged in a row and column architecture. For this type of architecture, the pixels are addressed along the rows, and the pixel output signals are transmitted via the columns. For example, all pixels on a selected row are processed simultaneously and sampled onto capacitors at the bottom of their respective columns. The pixel output signals from each row will be processed with column circuitry, in sequential fashion. In some cases the column circuitry has an analog to digital converter (ADC) for each column in order to convert the pixel output to digital signals. The digital signals are transferred from the column circuitry for further processing. One of the operations that is typically carried out in the column circuitry is correlated double sampling (CDS). Active pixels of the invention will typically include correlated double sampling in column circuitry. The implementation of correlated double sampling is described, for example in Koklu et al. "A Switched Capacitor Fully Differential Correlated Double Sampling Circuit for CMOS Image Sensors," 5th International Symposium on Medical Information and Communication Technology, 27-30 Mar. 2011, U.S. Pat. Nos. 10,129,497 B2, and 7,989,860 B2 which is incorporated for reference herein in their entirety for all purposes. While the invention is described for row and column addressing schemes, those in the art will appreciate that other architectures and addressing schemes can be used with the active pixels of the invention. See, for example U.S. Pat. No. 10,190,158 which is incorporated by reference in herein in its entirety for all purposes. In preferred embodiments, the active pixel sensor of the invention is a CMOS sensor.

FIG. 1 shows an embodiment of the active pixel of the invention in the context of an active pixel sensor array having row and column architecture. The active pixel 100 has a sensor element 120. The sensor element can be any suitable sensing element that is capable of converting an outside signal into an electrical signal, e.g. current or voltage. In some preferred embodiments, the sensing element is a photosensitive element such as a photodiode. While the current example is provided in the context of a light sensing element, the active pixel sensor can be used to sense other properties as described herein or are understood in the art.

The operation of the active pixel sensor utilizes a series of sequential frames, or time periods. For the active pixel sensor of the invention, the photosensitive element detects light for a time period during a frame (frame N), and at the end of the time period, a pixel output signal related to the amount of light detected during the current frame (frame N) and the light detected during the previous frame (frame N−1) is output from the pixel. The signal that is output is a comparison of the amount of light detected in the current frame (frame N) to the amount of light detected in the previous frame (frame N−1). In a preferred embodiment, the comparison between the frames is a difference. For example, if the amount of light detected during frame N produces a voltage of VN, and the amount of light detected during frame N−1 produces a voltage of VN−1, then the pixel output could be the voltage VN−VN−1 (or VN−1−VN) or the absolute value of the difference.

Frame N is followed by frame N+1, and at the end of frame N+1, the pixel output signal will represent a comparison of amounts of light detected during frames N and N+1. For the situation described above in which a difference is output, the pixel output could be the voltage VN+1−VN (or VN−VN+1) or the absolute value of the difference.

Thus, the pixel of the active pixel sensor of the invention does not output a signal proportional to the light detected during the frame as is typically the case for active pixel sensors, but outputs a differential, or comparison signal that relates to the signal obtained at the same pixel during an earlier time period. Others have described pixels that output a differential signal that compares signals obtained from different pixels on an array, but the current invention has advantages that are not realized with approaches that compare separate pixels. In addition, while signal processing approaches have been described that calculate a differential signal using separate processors, the present invention provides for obtaining a temporally differential output directly from the pixels, prior to any other signal processing.

The implementation of the invention above always compares one frame to the just previous frame. Other implementations of the invention can provide for comparisons to other sets of frames. For example, in one implementation the frame N is compared first with N+1, then with N+2. In one implementation N can be compared first with N+1, then with N+2, and then with N+3. This approach can be carried out with numbers of frames beyond N+3, for example, N+4, N+5, or N+6.

One implementation of a comparison process of the invention is in which a portion of the signal in each measurement is stored in one of the storage capacitors of the sensor element, thus producing a difference between the present measurement and a moving average of prior measurements that is weighted with an exponential impulse response. This can be implemented, for example, by shorting the two storage capacitors together for a time comparable with, or less than the RC time constant of the discharge between the two storage capacitors. Another method is to provide a significant difference in capacitance between the two capacitors such that when they are shorted together the resulting equilibrium voltage of the shorted capacitors becomes an asymmetric weighted average of the voltages prior to the shorting them.

Another implementation uses a nonlinear amplifier on the difference between the two signals. For example, a threshold detection system could be used in place of the differential amplifier such that for differences smaller than some threshold value V that the output signal would be zero, while for differences larger than the threshold, a fixed value would be output. Other nonlinear programs of input vs. output value have different uses, for example, a quadratic function would have the effect of providing expanded dynamic range for the sensor.

The methods of the invention utilize signal comparisons. These signal comparisons are typically electrical signal comparisons. In some cases, the comparisons are comparisons of voltages. In some cases the comparisons are comparisons of current. The comparisons can be comparisons of differences, of ratios, or other self-consistent mathematical comparison operations. Those of skill in the art will appreciate that in some cases, the same value could be represented as current or as voltage. In some cases a conversion from current to voltage or from voltage to current can be made by including relevant capacitance values. In some cases, the comparison is a linear comparison. In some cases, the comparison is a non-linear comparison, for example, Sqrt (Vn−Vn−1) or sqrt(Vn)−sqrt(Vn−1). Such non-linear comparisons can be useful by providing more dynamic range.

In preferred embodiments of the invention, the output signal is an analog signal. The provision of an analog signal is useful because it can be implemented without requiring the inclusion of analog to digital circuitry in each pixel. As is understood in the art, for reasons including cost, reproducibility, and fill factor, it is desirable to have as few circuit elements with a pixel as possible. The inventors have appreciated that, while the active pixels of the invention have more circuit elements than in many conventional active pixels, the advantages of the temporal differential output can be well worth it for some applications. The additional elements are required in order to carry out the comparison, e.g. using a differential amplifier. The inventors have found that implementing the active pixels of the current invention using analog circuitry can be very useful.

In some cases, a threshold analyzer can be used rather than a differential amplifier. In some cases, nonlinear difference amplifiers can be used. For example, with respect to the ground plane, a general case is f(v1,v2) where allows for the full two-dimensional response surface to the two voltages. An alternative space is f(v1−v2) where the function can be nonlinear. In some cases, the parameter of the function is just the one difference between the two voltages. Another case is where the output is defined by g(f(v1)−f(v2)) or g(f(v1)−h(v2)).

Figure 2:
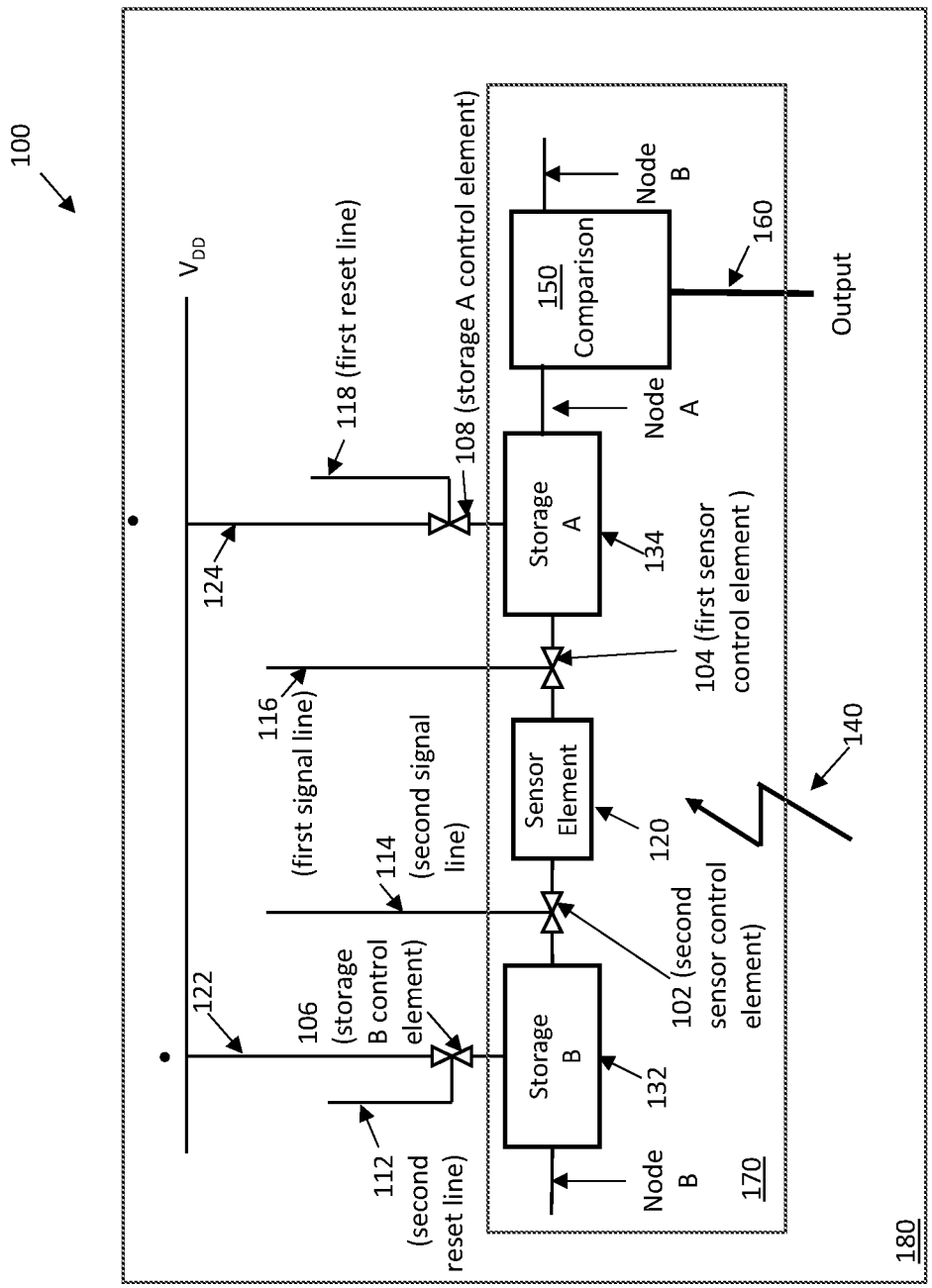
FIG. 2 shows an embodiment of a light sensing active pixel 100 of the invention.

FIG. 2 shows an embodiment of an integrated active pixel circuit 100 of the present disclosure. This figure can be used to describe in more detail how the present disclosure can be implemented. The circuit comprises a plurality of pixels 170 on a substrate 180. Although circuit 100 can have any number of pixels 170, only one such pixel is shown in FIG. 2. The circuit 100 comprises four classes of control elements, typically transistors, namely a second sensor control element 102, a first sensor control element 104, a storage B control element 106, and a storage A control element 108.

Each pixel 170 has a storage element A 132 and storage element B 134. Within a given pixel 170, signal lines 114 and 116 respectively connect to second sensor control element 102 and first sensor control element 104 and provide signals for controlling which storage (storage B 132 or storage A 134) is in electrical communicates with the sensor. The control elements 102 and 104 can, for example, have two states, one state that electrically isolates the components on either side of the control element, the other state to electrically connect the components on either side of the control element. While other control elements can be used, for the description of this embodiment, we will treat the control elements as transistors.

In some embodiments a single storage B control element 106 is in electrical communication with each storage B of each pixel 170 in the manner shown in FIG. 2. In some embodiments a single storage A control element 108 is in electrical communication with each storage B of each pixel 170 in the manner shown in FIG. 2. In alternative embodiments, each respective pixel 170 has its own storage B control element 106 in electrical communication with the storage B of the respective pixel 170 and its own single storage A control element 108 in electrical communication with the storage B of the respective pixel 170.

The storage B and storage A control elements 106 and 108 can, for example, have two states, one state that electrically isolates the storage A 134 and storage B 132 from a positive supply voltage line 122/124 and one that electrically connects the storage A 134 and storage B 132 positive supply voltage line 122/124.

While other control elements can be used, for the description of this embodiment, we will treat the control elements 104, 104, 106 and 108 as transistors.

In some embodiments, storage element A 132 and storage element B 134 are each capacitors. Where the storage elements are capacitors they will typically be connected to low or ground on one side of the capacitor. In the operation of the integrated active pixel circuit, one of the storage elements holds the signal for the previous frame, and the other storage element holds the signal for the current frame. In some embodiments storage elements 132 and 134 are connected to the comparison circuitry 150, for example, a differential amplifier, through node A and node B respectively. A pixel output signals is sent from the comparison circuitry at the end of each frame, or pair of frames, through output line 160.

In some embodiments, a pixel 170 does not have comparison circuitry 150. In some such embodiments, node A and node B serves as two independent output lines. In some such embodiments, a differential comparison of the electrical signal is made at the end of each pair of frames in downstream circuitry.

An embodiment of the operation of the temporal differential active pixel 170 can be described as follows: Prior to frame N, sensor element 120, e.g. photodiode, and storage element A 134 are reset to voltage $V_{DD}$, using first sensor control element 104 (set to an electrically conducting state) and storage A control element 108 (set to an electrically conducting state), after which first sensor control element 104 is set to an electrically isolating state that isolates sensor element 120 from storage element A 134 and storage A control element 108 is set to an electrically isolating state that isolates storage element A 134 from $V_{DD}$ (voltage reset line 124).

During frame N, sensor element 120 is exposed to light or some other observable 140, such as pressure, temperature, position, vibration, humidity, chemical species, or a fluid property. For example, when sensor element 120 is a photodiode, photons absorbed by the sensor element produce electrons, creating charges proportional to the amount of light that is absorbed. Near the end of frame N, sensor element 120 is connected to storage element A 134 through first sensor control element 104 using first signal line 116, such that the electrical state of storage element A 134 represents the state of sensor element 120 at this time. For example, where charges generated at a sensor element 120 (e.g., in the form of a photodiode) lower the voltage on sensor element from voltage VDD, storage element A will now reflect this lowered voltage. After a time sufficient for storage element A 134 to reflect the electrical state of sensor element 120, storage element A 134 is isolated from sensor element 120 by using first signal line 116 to change first sensor control element 104 into an electrically isolating state. At this time, storage element A has an electrical state (e.g. voltage) that represents the amount of light (or other observable) detected by sensor element 120 during frame N, and storage element B has an electrical state (e.g. voltage) that represents the amount of light detected by sensor element 120 during the previous frame N−1.

In some embodiments, storage element A 134 is connected to the comparison circuitry 150 through node A, and storage element B 132 is connected to the comparison circuitry 150 through node B. The comparison circuitry, for example a differential amplifier, combines these inputs to output a signal through output line 160. The signal that is output represents a comparison, for example a difference, between the electrical states of storage element A and storage element B, and therefore represents a difference between the light detected at frame N and the light detected at frame N−1. In some cases the output represents a straightforward difference between the voltage at element A and the voltage at element B.

Prior to frame N+1, sensor element 120, e.g. photodiode, and storage element B 132 are reset to voltage VDD, by setting storage B control element 106 and second sensor control element 102 to electrically conducting states, after which the second sensor control element 102 is switched (using second signal line 114) to an electrically isolating state that isolates the sensor element 120 from the storage element B 132 and storage B control element 106 106 is switched to an electrically isolating state (using second reset line 112) that isolates storage element B 132 from voltage reset line 122.

During frame N+1, sensor element 120 is exposed to light or some other observable 140. Near the end of frame N+1, sensor element 120 is connected to storage element B 132 by causing second sensor control element 102 to be in an electrically conducting state using second signal line 114, such that the electrical state of storage element B 132 represents the state of sensor element 120 at this time. After a time sufficient for storage element B 132 to reflect the electrical state of sensor element 120, storage element B 132 is isolated from sensor element 120 by placing second sensor control element 102 (using second signal line 114). At this time, storage element B has an electrical state (e.g. voltage) that is represents the amount of light (or other observable) detected by sensor element 120 during frame N+1, and storage element A has an electrical state (e.g. voltage) that represents the amount of light (or other observable) detected by sensor element 120 during the previous frame N.

In some embodiments, as illustrated in FIG. 2, storage element A 134 is connected to the comparison circuitry 150 through node A, and storage element B 132 is connected to the comparison circuitry 150 through node B. In some embodiments, the comparison circuitry 150, for example a differential amplifier, combines these inputs to output a signal through output line 160. The signal that is output represents a comparison, for example a difference, between the electrical states of storage element A 134 and storage element B 132, and therefore, the difference between the light detected at frame N and the light detected at frame N+1. In some cases the output represents a straightforward difference between the voltage at element A and the voltage at element B. In some alternative embodiments, the Node A and Node B are each outputted from pixel 170 and the comparison is performed on another circuit not shown in FIG. 2. This circuit can be part of circuit 100 outside of the pixel 170 or another circuit that is not part of circuit 100.

The above-described set of steps is continued for all frames going forward resulting in an output from each active pixel 170 of circuit 100 at the end of each frame that represents a difference between the amount of light (or other observable) detected during that frame and the light (or other observable) detected during the prior frame. Note that in a typical case, at the end of each frame, the comparison circuitry 150 will always output a difference between the state of storage element A 134 and storage element B 132, and that this will result in an alternation in which the output alternately represents (1) the difference between the current frame and the previous frame, and then (2) the difference between the previous frame and the current frame. It is straightforward to compensate for this alternation in downstream circuitry.

A method for performing a compensation is to use an analog-to-digital converter that covers the full range of both positive and negative difference values, and then multiplying odd-numbered frames by −1 while leaving even numbered frames unchanged. One of ordinary skill in the art will realize that there are numerous alternatives that have the same effect, some working prior to digital conversion, some working after conversion and others changing the interpretation of the data rather than the data stream itself. It will also be appreciated that some of the implementations, such as those that produce differences between a present measurement and a moving average of past measurements do not require this treatment.

In some cases, the output at the end of each frame, for each pixel, will be B−A. Because of the alternation of the storage elements, this can result in successive differential values with alternating sign. In some cases, it is desirable to remove this alternating sign of the voltage. To compensate for this, in some cases, every other frame is mathematically negated. There are a number of ways known in the art to carry this out. For example, there are both analog and digital ways to perform this. One way that can be used is to alternate which value is extracted from the load resistors in the differential pair. This way the output value really does take B−A on one frame and A−B on the next frame. Done digitally, the negation can be performed after ADC conversion in either hardware or software.

The above description focuses on a single active pixel 170. The active pixel 170 will typically be part of an active pixel array 100, typically having rows and columns. For an active pixel 170 as described above, for example, a row of such pixels will be selected near the end of a frame, and all of the pixels in that row will output a differential signal to the column. The column circuitry will further process and forward the signal for that row, and then the column circuitry will receive the output for a subsequent row. In some cases, the column circuitry performs analog to digital (A/D) conversion. Those of skill in the art will understand how to implement an appropriate array addressing scheme for the temporal differential active pixels of the invention.

Figure 3A:
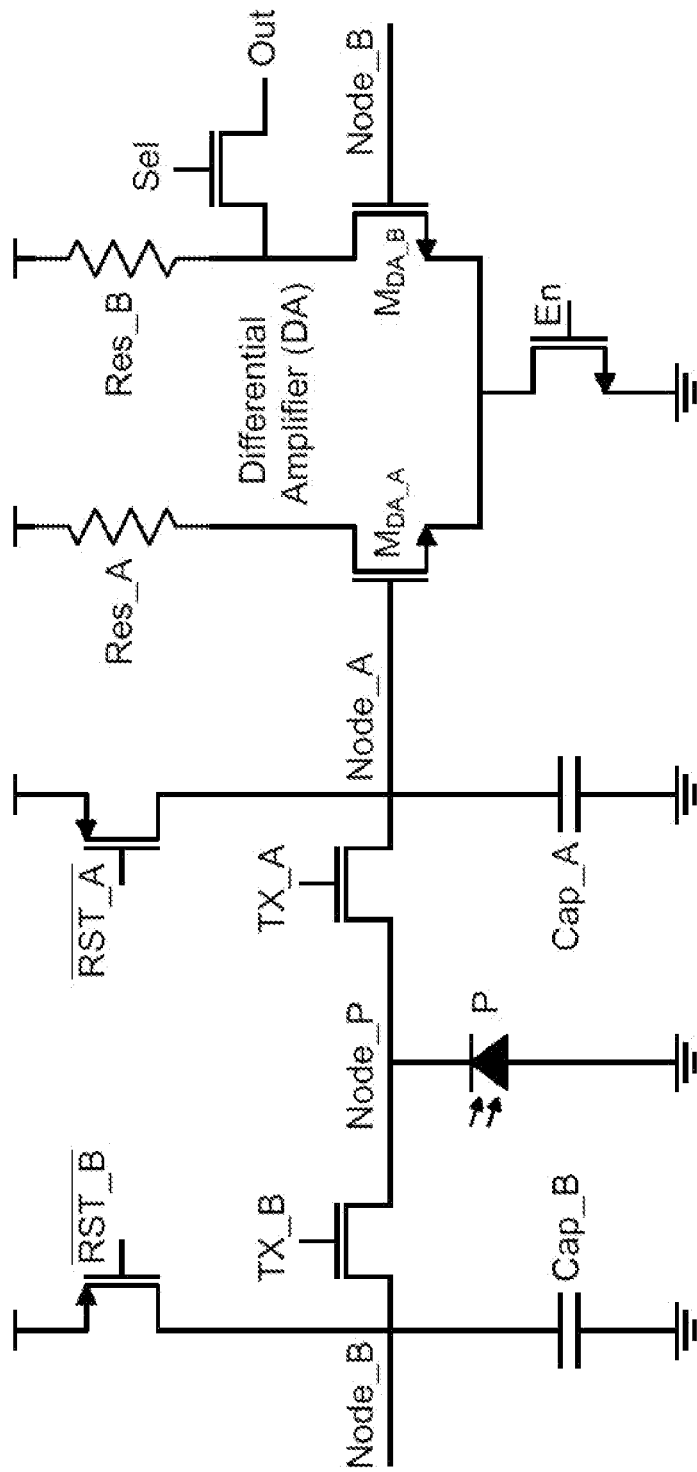
FIG. 3A provides an embodiment of a temporal differential active pixel array of the invention that utilizes a differential amplifier at each active pixel for comparing the temporal output.

FIG. 3A provides an embodiment of a temporal differential active pixel array of the invention that utilizes a differential amplifier at each active pixel 170 for comparing the temporal output. The storage elements in this embodiment are capacitors A and B, the sensor element is a photodiode P, and a select line transistor (Sel) is used to control the timing of the output signal (Out). The operation of the active pixel is controlled through transistors RST_A, TX_A, RST_B, TX_B, EN, and Sel.

Figure 3B:
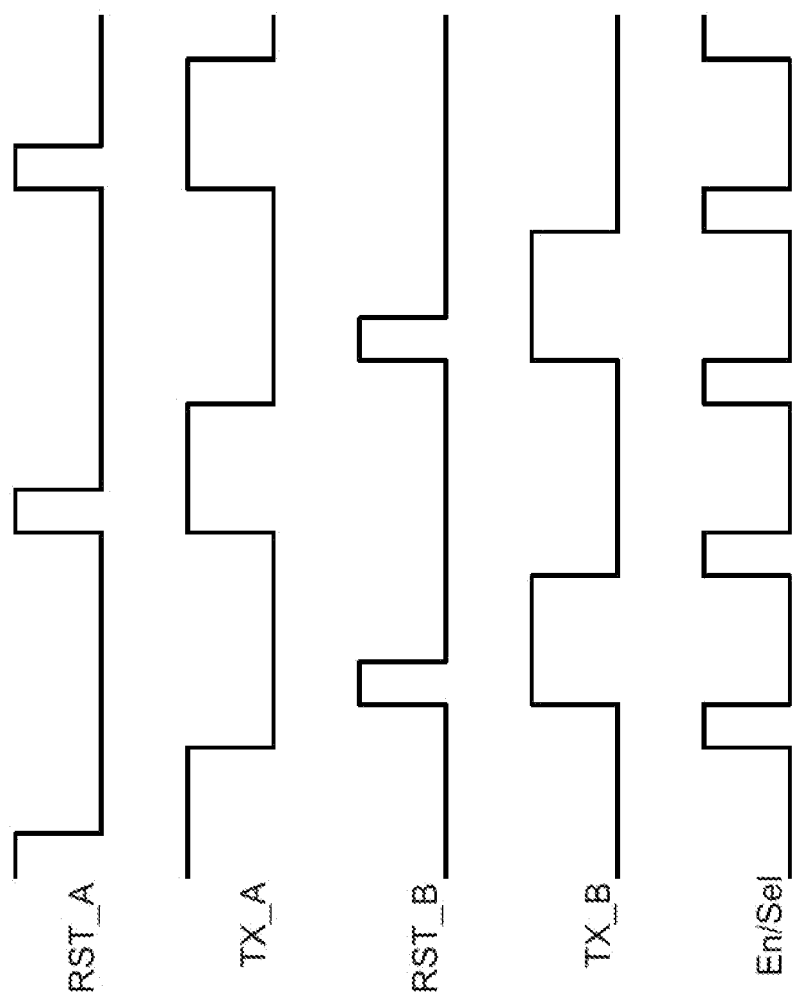
FIG. 3B shows an example of the timing and operation of the transistors controlling the active pixel of FIG. 3A.

The operation of the active pixel shown in FIG. 3A is similar to that described above for FIG. 2. FIG. 3B shows an example of the timing and operation of the transistors controlling the active pixel of FIG. 3A. Those of skill in the art will understand that there are alternative transistor addressing schemes for carrying out the operation of the temporal differential active pixel array.

An example of the operation of the temporal differential active pixel of FIG. 3A is provided here. At the end of frame N−1, the differential amplifier DA in the pixel 170 outputs an amplified signal, which is proportional to the difference in voltage between storage elements A and B. This amplified signal is output to a signal output line (typically a column line). At the end of frame N−1 the voltage on storage element A represents the number of photons collected at the photodiode over frame N−1, and the voltage of storage element B represents the number of photons collected at the photodiode over frame N−2.

Storage element B is reset (and typically the photodiode is also reset) to a known voltage (e.g. VDD).

Transistor TXB is turned on to connect storage element B to the photodiode.

The photodiode receives light for a frame time (frame N). The absorbed photons create charges that lower the voltage storage on element B. The voltage at the end of the frame time N at storage element B represent the number of photons absorbed by the photodiode.

Transistor TXB is turned off to isolate the photodiode from the storage element B.

Storage elements A and B are each independently connected to a differential amplifier circuit DA. DA is connected to the signal output line through a select transistor SEL. SEL is turned on to output an amplified signal that represents the voltage difference between storage element B (frame N) and storage element A (frame N−1).

Storage element A is reset (and typically the photodiode is also reset) to a known voltage (e.g. VDD).

Transistor TXA is turned on to connect storage element A to the photodiode

The photodiode receives light for a frame time (frame N+1). The absorbed photons create charges that lower the voltage storage element A. The voltage at the end of the frame time N at storage element A represent the number of photons absorbed by the photodiode.

Transistor TXA is turned off to isolate the photodiode from the storage element A.

Figure 4A:
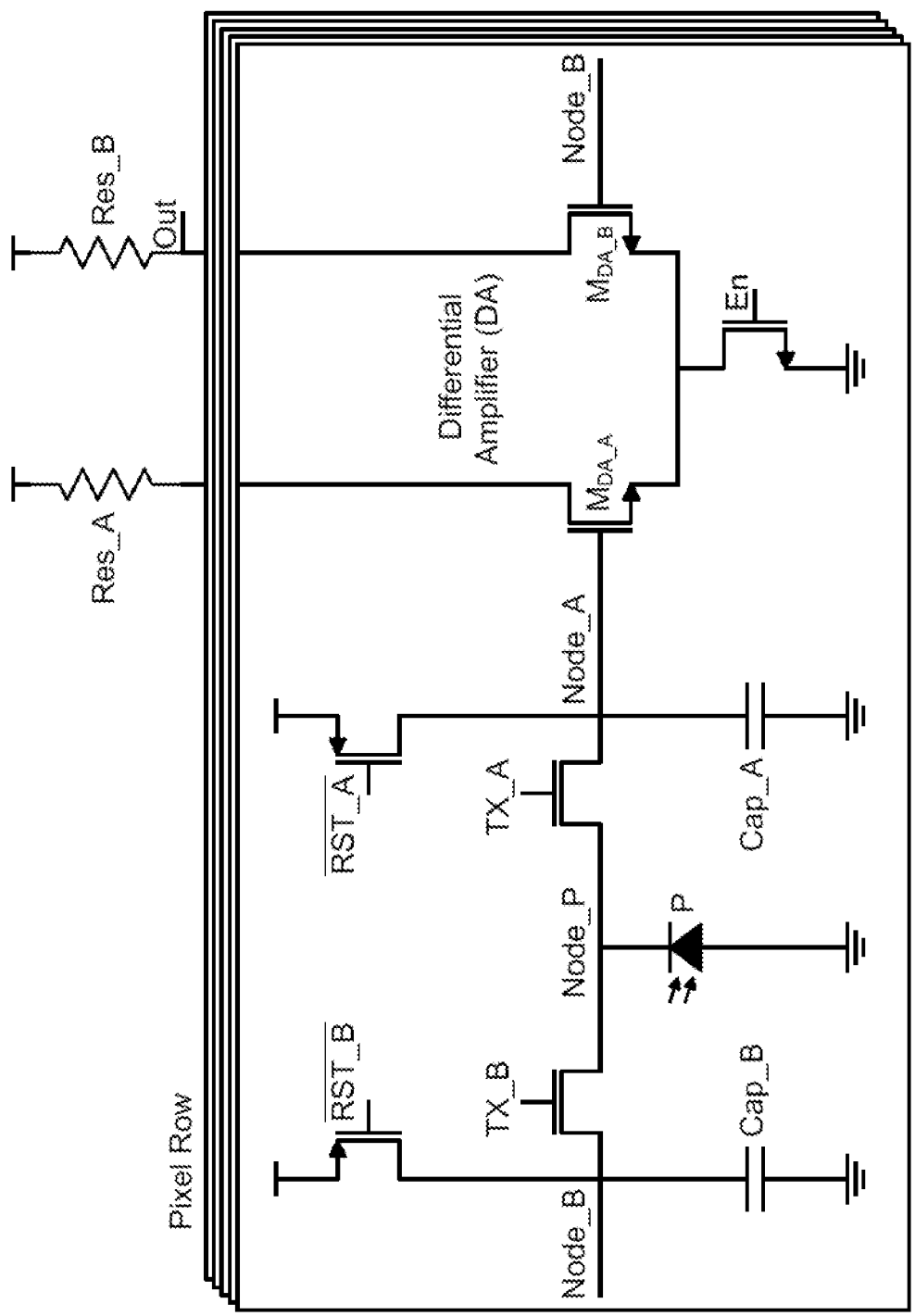
FIG. 4A shows an alternative embodiment of a temporal differential active pixel of the invention. The active pixels in a common row FIG. 4A share common load resistors that reside outside of the pixel.

Storage elements A and B are each independently connected to a differential amplifier circuit DA. DA is connected to the signal output line through a select transistor SEL. SEL is turned on to output a voltage that represents the voltage difference between storage element A (frame N+1) and storage element B (frame N). The above is repeated FIG. 4A shows an alternative embodiment. The pixel shown in FIG. 3A contains in-pixel load resistors, used to convert a differential current into an output voltage. The Sel transistor in that embodiment can be asserted to feed a differential voltage value from one pixel to a common output net for further processing. In some cases, relatively large resistors are required to effectively carry out this scheme. Thus, in some cases, these resistors reside outside of the pixel. FIG. 4A provides one way to accomplish this. The pixel in FIG. 4A does not contain in-pixel resistors for output. Instead, the pixels in a common row share a load resistor. When a specific pixel is to-be-measured, the enable transistor on the bottom of the differential amplifier is asserted, allowing current to flow through it's differential pair and establish a differential voltage across the resistors. Only one pixel in a row is activated at a time, so current is not flowing through the differential pairs of inactive pixels. Note that the En transistor in FIG. 4A can be used to both digitally turn a differential pair in a pixel on and off, while at the same time establish a specific current level (when on) to ensure proper biasing of the differential amplifier.

Figure 4B:
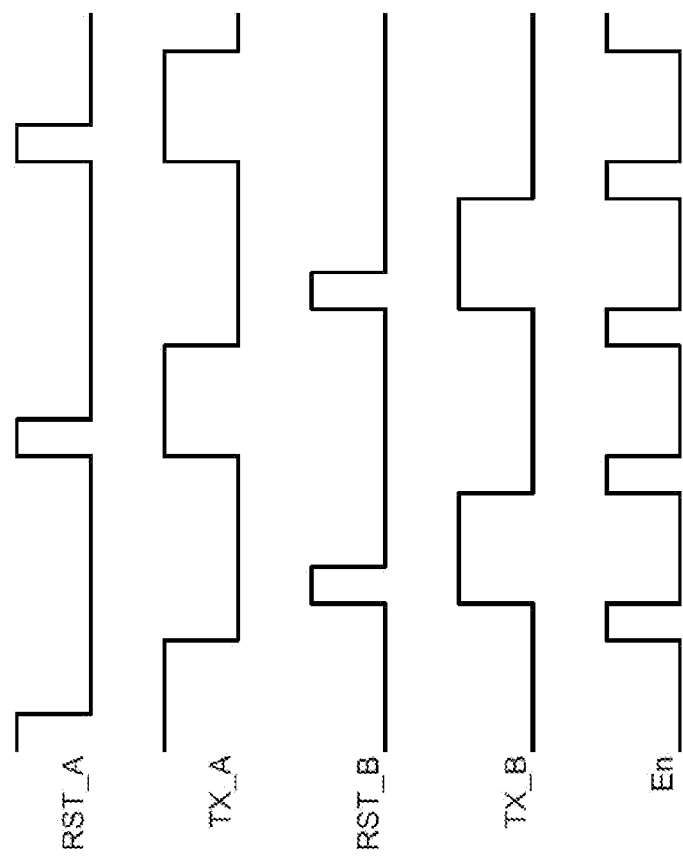
FIG. 4B shows an embodiment of the timing and operation of the transistors in the active pixel of FIG. 4A.

FIG. 4B shows an embodiment of the timing and operation of the transistors in the active pixel of FIG. 4A.

Figure 5:
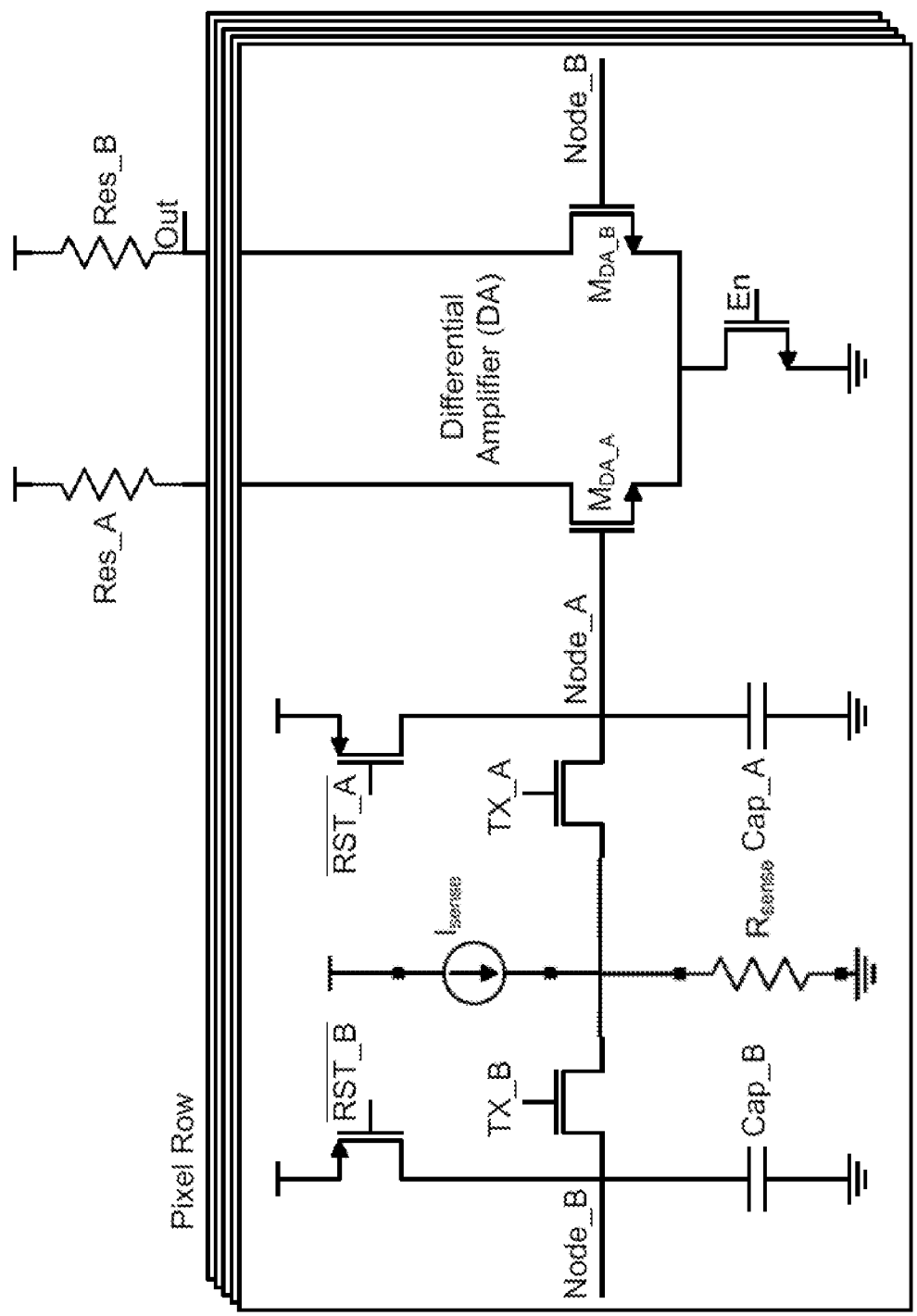
FIG. 5 shows an embodiment in which the sensor element in the active pixel is a current sensor.

FIG. 5 shows an embodiment similar to the embodiment shown in FIG. 4A, in which the sensor element is a current sensor. In this embodiment, the current source represents, for example, a nanofet whose current value is being measured. Rsense is a sense resistor that is used to translate the nanofet's current into a voltage value. In this way, the value of interest is the voltage generated across Rsense which will fluctuate as the nanofet current modulates. This voltage value is then used in a similar fashion to the voltage value obtained from a photodiode previously described.

This embodiment shows how the temporal active pixel sensor of the invention can be used for the measurements other than that of incident light. A variety of properties, including temperature, pressure, and the presence and amount of chemical species can be measured using a transducer that provides a current output representing the desired property.

Figure 6A:
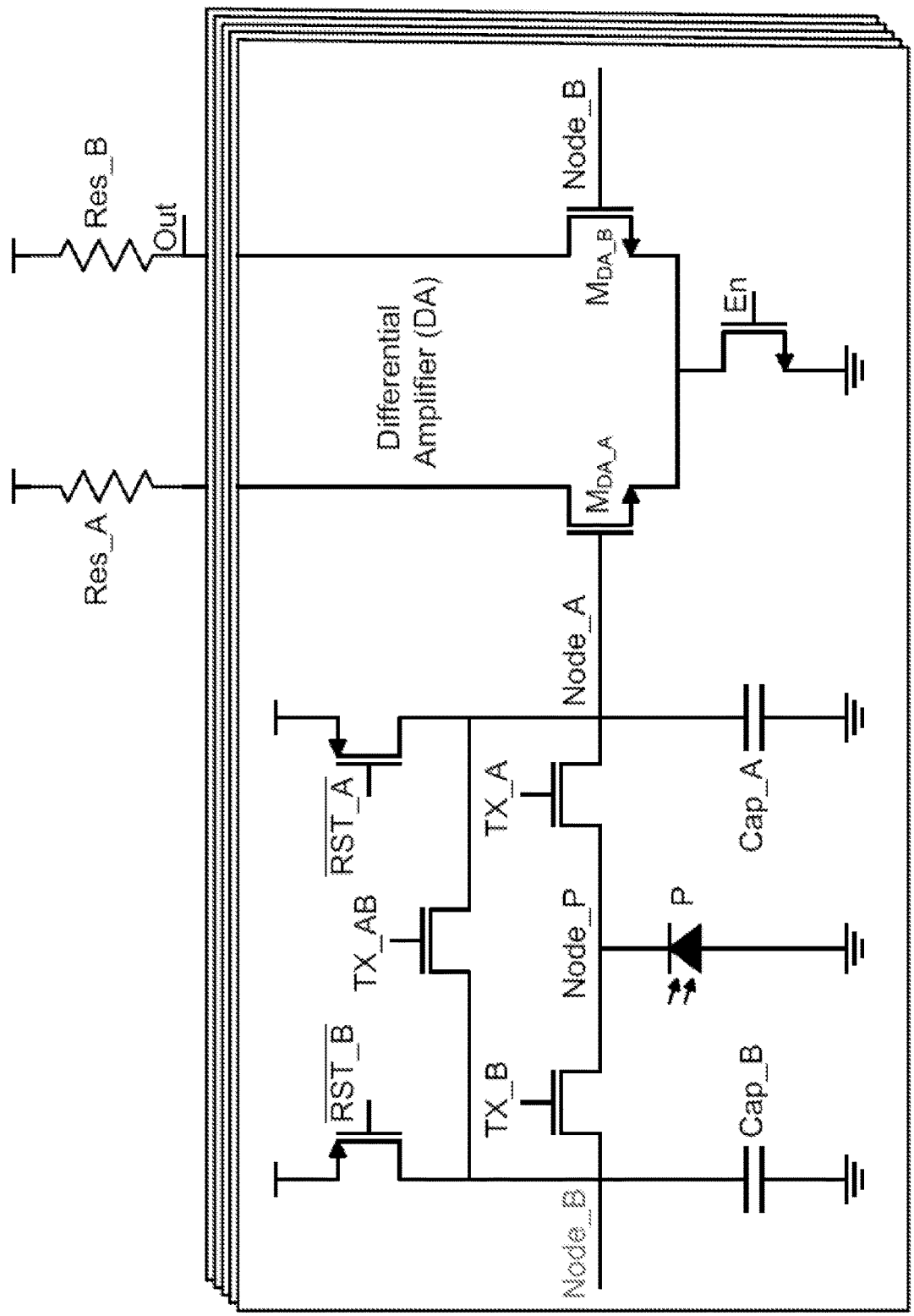
FIG. 6A shows an embodiment of an active pixel of a temporal differential active pixel in which the output at the end of each frame represents the difference between the running average of a past number of frames and the current frame.

FIG. 6A shows an embodiment of an active pixel of a temporal differential active pixel in which the output at the end of each frame represents the difference between the running average of the past X number of frames and the current frame.

As with other embodiments described herein, the active pixel shown in FIG. 6A performs differential measurements between the voltage on Node_B and the voltage on Node_A. The difference for the active pixel shown in FIG. 6A as compared to other embodiments is that here, Node_A is being used to track a running average of the collected signal for each frame. In this way, the differential measurement is between the current frame and the last X number of frames, weighted by an exponential response function. The length of the memory of the running average is determined by how much larger Cap_A is than Cap_B.

Figure 6B:
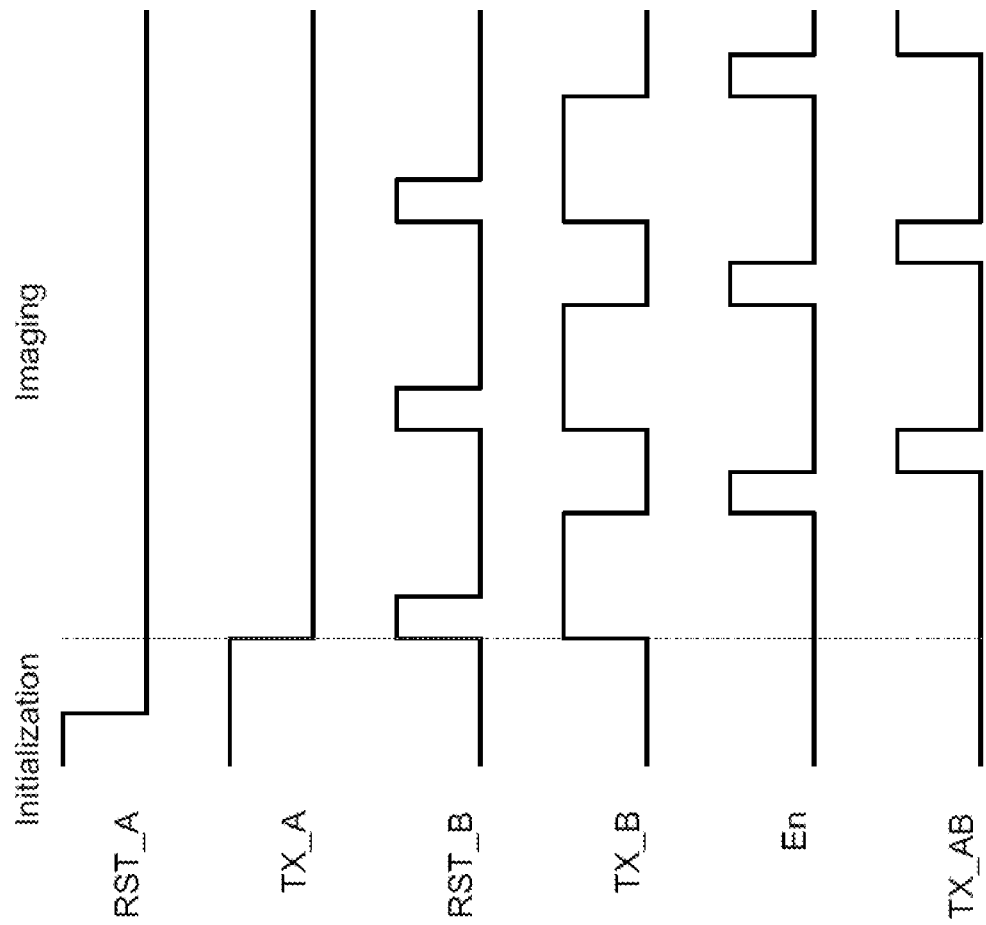
FIG. 6B shows an embodiment of the timing and operation of the transistors in the active pixel of FIG. 6A.

FIG. 6B shows an embodiment of the timing and operation of the transistors in the active pixel of FIG. 6A.

Initialization: RST_A and TX_A are asserted together during initialization, as we've illustrated in the timing diagram. This allows for resetting the value of Cap_A and initializing the voltage across the photodiode. RST_A is then turned off, while TX_A is kept on. This period of time, where TX_A is on and RST_A is off, is our initial integration time for the capacitor Cap_A.

Imaging: RST_B is asserted to reset the value on Cap_B. TX_B is then turned on and the voltage across Cap_B drops over time. TX_B is then turned off and a differential measurement is performed between the voltages on nodes Node_B and Node_A. At this point, TX_AB is turned on. This will in effect store the weighted average of V(Node_B) and V(Node_A) on both Cap_B and Cap_A. Since Cap_A is 4× larger than Cap_B, the average will be weighted towards the initial Node_A voltage value. At this point, TX_AB is turned off. The pixel is then ready for another frame, starting with the assertion of RST_B.

Figure 7A:
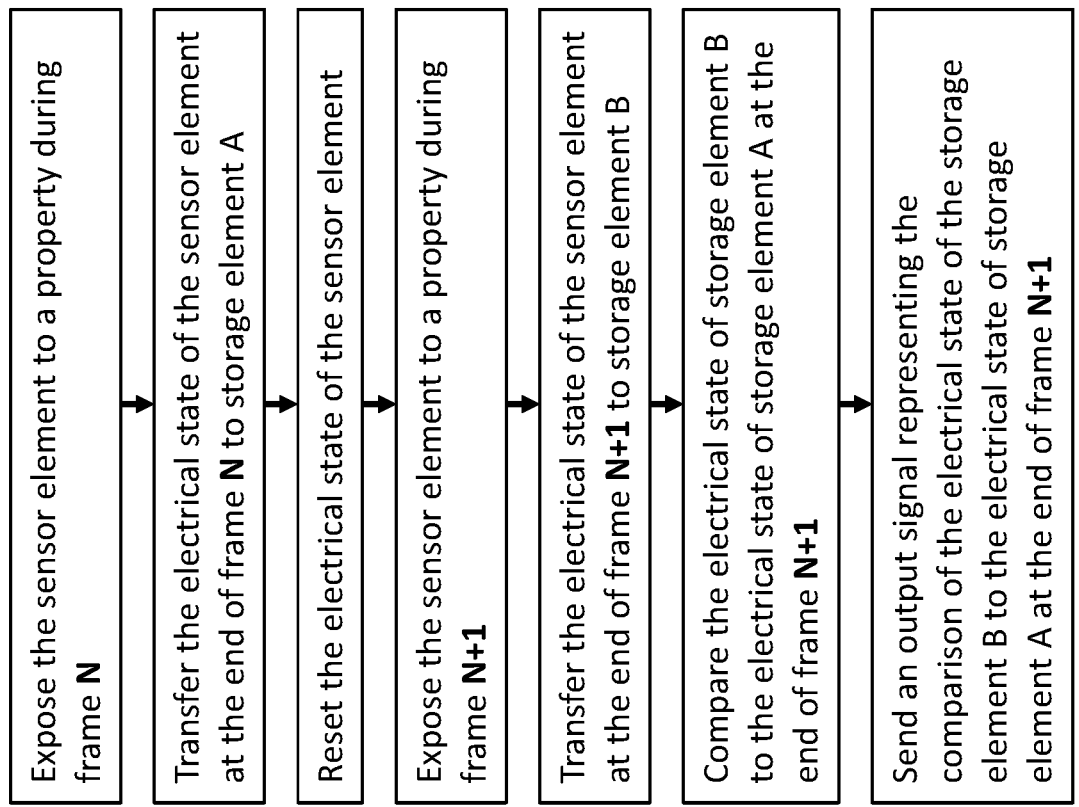
FIGS. 7A and 7B provide a flow chart outlining a method of the invention for the operation of a temporal active pixel of the invention.
Figure 7B:
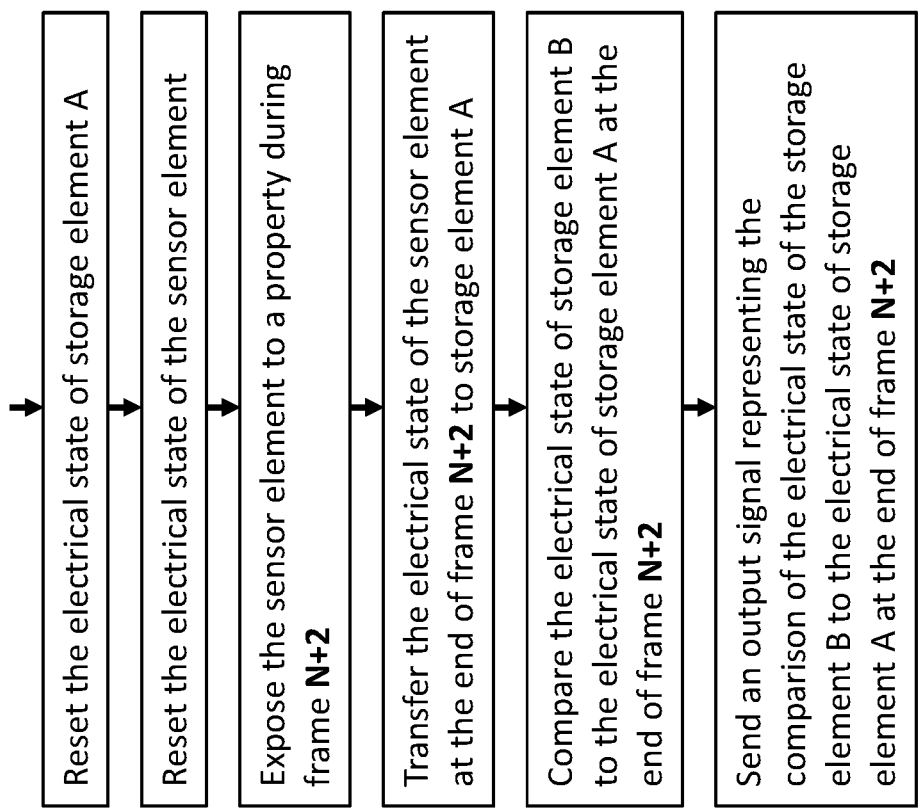

The present invention also provides methods for utilizing a temporal active pixel and a temporal active pixel array. FIGS. 7A and 7B provide a flow chart outlining a method of the invention for the operation of a temporal active pixel of the invention. It is understood that the active pixel is repeatedly measuring over many frames, and that this description relates to one of the frames. The method describes a sensor in the active pixel that measures a property. Typically the sensor is a photosensor such as a photodiode, but other sensors such as those described herein can be used with the temporal active pixel sensors of the invention.

During frame N the sensor element in the active pixel is exposed to the property, e.g. light. The sensor element typically measures an amount of such property, such as the number of photons or integrated light flux. The frame is a period of time that is set for the given sensor depending on the type of measurement that is desired. The sensor element measures the amount of a given property detected over that period of time. Near the end of the frame, the electrical state of the sensor element represents the amount of the property (e.g. number of photons) detected.

Near the end of frame N, the electrical state of the sensor element is transferred to storage element A, and the electrical state of the sensor is reset.

During frame N+1, the sensor is again exposed to the property of interest. Typically, the frame N+1 is set to be the same time as frame N. This allows the electrical state of the sensor element to represent the amount of a given property detected over that fixed period of time.

Near the end of frame N+1, the electrical state of the sensor element is transferred to storage element B. At this point, the electrical state of storage element A represents the amount of the property measured by the sensor element during frame N, and the electrical state of storage element B represents the amount of the property measured by the sensor element during frame N+1.

The electrical state of storage element B is then compared with the electrical state of storage element A. This comparison, e.g. a difference, can be carried out, for example using a differential amplifier.

An output signal representing the comparison is then sent out of the pixel. The output signal can be sent, for example down a column line of a sensor array. For example, all of the temporal active pixels in a row can be provided with a select signal to each simultaneously provide an output signal down its respective column. This select process can be carried out sequentially for each of the rows in the array as is well known in the art.

This process is then repeated for frames N+2, N+3 and so on, with each output signal representing a comparison between the last frame and the frame before it. The output signal from each pixel is a temporal differential between consecutive frames. The comparison operation within each pixel in the array is typically the same. In some cases, the comparison operation will be different for different pixels in the array. For example, in some cases, different portions of the array can be set to have comparison operations to compensate for know differences in the spatial variation of the property to be detected. The comparison can be a straight voltage to voltage or charge state to charge state difference, or can involve weighting factors or other comparisons. In the most general implementations, the output signal is a general function f of the two voltages VA and VB. In many useful implementations the comparator circuit provides a response that depends on the difference of the two voltages. In some useful implementations the response could be linear, quadratic, polynomial, sigmoidal, exponential, sinusoidal or combinations of these responses.

While it is stated above that the process is repeated, it is important to note that for some implementations, at each sequential frame the role of storage element A and storage element B are switched. This is illustrated in the flow diagram of FIG. 7B describing the continued operation of the pixel of FIG. 7A in the next frame. The electrical state of storage element A is reset, and the electrical state of the sensor element is reset. As for the previous frames, for frame N+2, the sensor element is exposed to the property of interest. Near the end of frame N+2, the electrical state of the sensor element is transferred to storage element A.

The electrical state of storage element A is then compared with the electrical state of storage element B, and an output signal representing the comparison is then sent out of the pixel.

While this operation is very similar to that for the previous frame, it is important to note that the role of sensor element A and sensor element B are reversed. Thus, in the typical operation of the temporal active pixel, the output signal will always represent e.g. *A minus B*, but the output signal will alternately represent: 1) the electrical state of the current frame minus the electrical state of the prior frame, then 2) the electrical state of the previous frame minus the electrical state of the current frame. In some cases, this alternating output can be compensated for in circuitry outside the pixel, for example in the column circuitry. In some cases, circuitry can be included within the active pixel that compensates for the alternating operation. In many cases it is preferred to compensate for the alternation in the column circuitry so as not to burden the active pixel with additional circuit elements.

Active Pixel Sensors.

The active pixel array sensors of the invention can be any suitable type of sensor. The term sensor can refer, for example to a transducer. The transducer can convert variations in a physical quantity into an electrical signal. The physical signal that is detected by the sensor can be, for example, light, pressure, temperature, magnetic fields, electric fields, gravity, position, vibration, sound, humidity, chemical species, biological species, or fluid properties.

Preferred sensors are those that detect light. Sensor elements for detecting light can include, for example, photodiodes, photo-transistors, and light dependent resistors. Suitable light sensors include CCD (charge coupled device), and CMOS (complementary metal-oxide semiconductors). Typically, the active pixel sensors of the invention will be CMOS sensors.

The sensors of the invention can also be chemical or biochemical sensors. These can be, for example, devices that can provide information about the chemical composition of an environment, typically either in a liquid phase or a gas phase. The sensor of the invention can be a biosensor, which detect analytes having a biological component, such as cells, proteins, nucleic acids, sugars, or other biomolecules. Biosensors of the invention can be used for either in-vitro or in-vivo applications.

The active pixels of the invention typically include only analog circuitry. The use of analog circuitry allows for fewer circuit elements within the pixel. Having fewer circuit elements in the pixel can be useful to provide a pixel with increased active area. The analog circuitry can be linear or non-linear. In some cases, the active pixels of the invention can include an analog to digital converter, and can include digital circuits to carry out the operations of the pixel including the comparing operations. ADC conversion in-pixel can be useful, for example, if the appropriate threshold values can be established. For example, if B−A>threshold then output=1 else 0. While significant amounts of information can be lost in the ADC conversion, establishing a threshold can in some cases provide enough information for the desired analysis, e.g. nucleic acid sequencing. Carrying out this operation this in-pixel can simplify down-stream electronics. The differential amplifier could then also be designed to function more like a comparator, which could simplify it's implementation.

Sensors that measure incoming light, typically referred to as image sensors, typically have of millions of active pixel sensors responsible for capturing the intensity of the pre-filtered light passing through. Each individual pixel sensor then converts the detected intensity level into a voltage signal before passing it down to the another part of the chip, such as the analog-to-digital convertor. For image sensors, the source of the electromagnetic radiation is light, made up of photons. The intensity of a light is proportional to the amount of photons associated with it. Typically, the number of electrons collected at the sensor element in the pixel is relative to the number of photons striking the pixel sensor element. The resulting charge of the electrons emitted can be converted into a voltage signal within the pixel sensor as described herein. The active pixel can then output a voltage signal.

The active pixel sensors of the invention also typically have control circuit elements outside of the pixels. For example, the sensor, typically a CMOS sensor, will have a digital controller which includes a set of circuitry integrated on the CMOS sensor that controls the pixel array. It has multiple components, including the clock/timing generator and oscillator to ensure that every pixel in the array is in sync with each other. It is responsible for telling the pixels in array when to start capturing light.

Active pixel sensors (APSs) typically utilize at least one active element within each pixel to accomplish amplification, pixel selection, charge storage or a similar benefit. As such, APS devices have many of the benefits of CCDs including high sensitivity, high signal fidelity and large array formats. Because APS cells can be accessed in a row-wise manner, the problems arising from transferring charge across pixel cells, as is done in CCD sensors, are alleviated. Additional comparisons between APS cells and other devices are presented in, for example, "Active Pixel Sensors: Are CCD's Dinosaurs?" in Proceedings of SPIE:

Charge-Coupled Devices and Solid State Optical Sensors III, Vol. 30, pp. 2-14 (1993) by E. R. Fossum, which is hereby incorporated by reference.

One form of APS utilizes a photodiode p-n junction and a source-follower buffer in each pixel. An alternative APS design uses a metal-on-silicon (MOS) photogate to accumulate charge proportional to light incident during an integration period. The charge can be shifted to a sensing region for readout. The sensing region can also be reset, allowing a reference output indicative of noise levels. The reference can be subtracted from the integrated light value to implement correlated double sampling. A photogate device presents several benefits. Photogates tend to have a low noise level compared to other devices such as photodiodes. This results in the need for less integration time to achieve a desired light sensitivity. A photogate APS is compatible with standard CMOS manufacturing methods. This allows an APS array together with control and processing circuitry to be built on the same integrated circuit chip.

Active pixel sensors are described, for example in U.S. Pat. Nos. 8,687,097, 7,227,490, 6,753,904, 6,563,540, 6,201,572, 6,008,486, 5,923,369, 5,841,126, and 5,631,704, which are incorporated by reference herein for all purposes; and in publications: Keim, R. "The Basic MOSFET Differential Pair", Online—[retrieved 2018 Jun. 19] https://www.allaboutcircuits.com/technical-articles/the-basic-mosfet-differential-pair/, 2016 Jun. 9, Takayanagi et al. "Recent Progress in High-Resolution and High-Speed CMOS Image Sensor Technology", Extended Abstracts of the 2009 International Conference on Solid State Devices and Materials, Sendai, 2009; Suat et al. "Differential Mode CMOS Active Pixel Sensor (APS) for Optically Programmable Gate Array (OPGA)" Proceedings of SPIE—The International Society for Optical Engineering—December 2002; Duque-Carrillo et al. "Control of the Common-Mode Component in CMOS Continuous-Time Fully Differential Signal Processing", Analog Integrated Circuits and Signal Processing 4, 131-140 (1993); El-Desouki, et al. "CMOS Image Sensors for High Speed Applications", Sensors 2009, 9, 430-444; doi: 10.3390/s90100430; Zhang et al. "CMOS Image Sensor with On-Chip Image Compression: A Review and Performance Analysis" Journal of Sensors Volume 2010, Article ID 92069; Chi et al. "CMOS Camera With In-Pixel Temporal Change Detection and ADC", IEEE JOURNAL OF SOLID-STATE CIRCUITS, VOL. 42, NO. 10, OCTOBER 2007; Aizawa et al. "On Sensor Video Compression", IEEE Transactions on Circuits and Systems for Video Technology 7(3):543-548—July 1997; and Koklu et al. "A Switched Capacitor Fully Differential Correlated Double Sampling Circuit for CMOS Image Sensors", 5th International Symposium on Medical Information and Communication Technology, 27-30 Mar. 2011 which are incorporated by reference herein for all purposes.

Nucleic Acid Sequencing.

In some aspects, the invention provides methods, devices, systems, and compositions of matter directed to sequencing including methods directed to single-molecule sequencing. Methods for using a CMOS sensor for monitoring nucleic acid sequencing are described, for example, in U.S. Pat. Nos. 9,157,864, 9,410,891, 8,467,061, 9,372,308, 9,223,084, 9,624,540, and 9,606,068 which are incorporated herein by reference in their entirety for all purposes. It is known in the art that many of the single-molecule detection systems are subject to device-to-device variation. For example, in the case of multiplexed sequencing methods in which there are multiple sequencing reactions being measured in parallel, for example in SMRT® sequencing, as described for example in U.S. Pat. Nos. 7,056,661 and 7,170,050 which are incorporated herein by reference in their entirety for all purposes, the critical dimensions of manufacture of sequencing measurement devices can vary even between adjacent devices on the same chip. This can lead to significant differences in the baseline signal that greatly increase the required dynamic range, and thus the bit depth, of the electronic readout of the devices. By using a difference signal, the electronics are less sensitive, and in some cases, largely immune to the differences in the baseline value from different devices, concentrating the dynamic range they have on the temporal differences that constitute the information-bearing signal from which sequence information is drawn. In another example, electronic sequencing methods such as single molecule FET sequencing can be used with the invention. See, for example U.S. Pat. Nos. 9,164,053, 9,151,751, 8,961,757 and U.S. Patent Applications 2015/0171326 which is incorporated herein by reference in their entirety for all purposes. For such FET methods, it is know that 1/f noise can cause significant drift in the baseline signal even within a single device from one time point to another time point. In this application, the use of difference signals similarly alleviates the need to use large bit-depth sensors to allow capture of the relevant range of possible output voltages. This results in lower power consumption, easier export of the data from the sensor chip and high-resolution capture of the signal fluctuations. A broad range of the real-time single-molecule sequencing methods known to date produce signals that can benefit from the use of differential sensing.

The temporal differential output provided by the instant application can be useful, for example, for reading multiple enzymes from a single pixel in the array. It we can distinguish many levels, then perhaps we can decouple two enzymes emitting onto the same pixel if they have different irradiance levels.

In some aspects, the invention can be directed to electronic nucleic acid sequencing—detecting nucleic acid sequencing using electronic detectors. The nucleic acid sequencing can be single molecule sequencing using electronic detectors. The detectors can include, for example, nanopores, redox electrodes, electrodes having nanogaps, and field effect transistors (FETs) including nano-FET devices. Such devices are described, for example, in U.S. Pat. Nos. 9,708,656 and 10,273,537 which is incorporated herein by reference in their entirety for all purposes.

The sensor element of the active pixel can be, for example, a nano-electronic measurement device (e.g, a nanoscale field effect transistor herein termed a nanoFETs), where the nano-electronic measurement devices are sensitive to molecular interactions in the vicinity of the channel of the devices. In some aspects, a single polymerase-template complex is immobilized on or proximate to the channel of a nano-electronic measurement device, and the electrical signal from the nano-electronic measurement device is used for determining a nucleic acid sequence. The nano-electronic measurement devices of the invention typically have a nanoscale channel that comprises a nanowire such a carbon nanotube.

As described above, the pixels of the invention can be used with nanoFETs, for example, where the current source in the pixel represents a nanoFET whose current value we're trying to measure. A sense resistor can be used to translate the nanoFET's current into a voltage value. In this way, the value of interest is the voltage generated across the sense resistor which will fluctuate as the nanoFET current modulates. This voltage value can then be used in a similar fashion to the voltage value obtained from a photodiode previously described herein.

Typically, four nucleotide analogs, each having a different distinguishable charge label, are present. The term charge label is used to designate a label that will produce a change in the electrical signal at a nano-electronic measurement device. In some cases, this change in electrical signal is due to a change in the voltage across the channel of the nano-electronic measurement device or a change in the current through the channel of the nano-electronic measurement device, but the change in electrical signal can include other aspects as described in more detail below. The charge label is typically connected to the nucleotide analog through the phosphate portion of the nucleotide analog such that when the nucleotide analog is incorporated by the polymerase enzyme into a growing nascent nucleic acid strand, the label is released. The charge label is typically connected to the nucleotide portion of the analog through a linker. When the nucleotide analog is held in the polymerase enzyme active site during the incorporation reaction, the charge label produces a change in an electrical parameter of the nano-electronic measurement device. The change in electrical signal, such as voltage across the channel, current through the channel, or impedance of the channel (in the case of an AC voltage to the measurement device), can be used to determine the presence and the identity of the nucleotide analog that is in the active site of the polymerase enzyme. The electrical characteristics of the nano-electronic measurement device while a particular nucleotide type is in the active site will be different than the case when other nucleotide type is are in the active site. Because the nucleotide of a particular nucleotide type is held close to the channel of the nano-electronic measurement device during the incorporation process by the enzyme, it is held in place long enough for a characteristic electrical parameter value associated with the interaction of the nucleotide type with the nano-electronic measurement device to be determined in order to detect the presence of the nucleotide and also to identify which type of nucleotide is being incorporated.

Suitable arrays for the instant invention are described in U.S. Patent Application 2017/024,049 entitled "SINGLE-MOLECULE NANOFET SEQUENCING SYSTEMS AND METHODS" filed on Aug. 3, 2016, which is incorporated herein by reference for all purposes. In particular, suitable arrays in which the location of the nucleotide exit region of a polymerase are controlled, polymerase bound through fusion protein or particle is described, techniques for assisted loading of carbon nanotubes onto a chip are described, increased Debye screening length of channels of measurement devices are described, surface treatment of nanoFET gates are described, the use of a reference nanowire are described, alternative sequencing modes are described, NanoFETs within recessed regions are described, capacitive filters for improving signal to noise are described, the use of an Allosteric Signal for sequence reads is described, lowered background noise using tangential fields, nucleic acid binding agents and/or nucleases are described, and intentional lowering of Debye screening are described in U.S. patent application entitled "SINGLE-MOLECULE NANOFET SEQUENCING SYSTEMS AND METHODS" filed on Aug. 3, 2016, which is incorporated herein by reference for all purposes.

Chips having arrays of nanoscale electronic elements having nano-electronic measurement devices can be used. Each nano-electronic measurement device performs a sequencing reaction in real time, allowing for hundreds, thousands, millions, tens of millions or more sequencing reactions to be monitored simultaneously. The nanoscale elements used in devices, such as the source, gate, channel and drain, are typically constructed to have a small size, and therefore to have low levels of capacitance noise. This allows for rapid transfer of current for electronic measurements of events which typically occur on the microsecond to millisecond timescale. The chips can be prepared using known semiconductor processing techniques, for example on a silicon substrate. The nano-electronic measurement devices in the array have a polymerase enzyme-template complex attached to the channels of the nano-electronic measurement devices, proximate to the gates.

Processes for forming nano-electronic measurement device arrays on CMOS sensors are known in the art. Such sensors can be formed, for example by transferring nanotubes onto a CMOS integrated circuit (see Meric et al. "Hybrid carbon nanotube-silicon complementary metal oxide semiconductor circuits" Journal of Vacuum Science & Technology B. 2007; 25(6):2577-80. doi: 10.1116/1.2800322 which is incorporated herein by reference in its entirety. Techniques such as this help to circumvent the mismatch between nanotube growth temperatures and the maximum temperature tolerated by a CMOS device. In some cases, devices of the invention can made by employing a transfer of arrays of grown parallel tubes to arbitrary substrates (See, for example Kang et al. "High-performance electronics using dense, perfectly aligned arrays of single-walled carbon nanotubes" Nat Nano. 2007; 2(4):230-6) which is incorporated herein by reference in its entirety.

The chip will typically have multiple nano-electronic measurement device, for example, greater than 1,000 nano-electronic measurement devices, or greater than 10,000 nano-electronic measurement devices. The chip can have, for example, about 1,000 nano-electronic measurement devices to about 10 million nano-electronic measurement devices or about 10,000 nano-electronic measurement devices to about 1 million nanoFET nano-electronic measurement devices.

The chip is typically made using semiconductor processing techniques, allowing for the inclusion of other functionality on the chip including electronic elements for one or more of: providing electrical signals to the nano-electronic measurement devices, measuring the electrical signals at the nano-electronic measurement device, analog to digital conversion, signal processing, and data storage. The electrical elements can be, for example, CMOS elements.

Some embodiments of the invention use a sparse amplifier array, which is an array of nano-electronic measurement devices on a chip where the array is produced such that in operation only a small percentage of nano-electronic measurement devices is addressed, and the remainder are not used. In some cases, the percentage of nano-electronic measurement devices addressed is less than 5%, less than 2%, less than 1%, less than 0.5%, or less than 0.2% of the total number of nano-electronic measurement devices produced in the array. This aspect of the invention can be accomplished by the structure of the chip, the methods of addressing the chip, the methods of analyzing the chip, and combinations of any of these. In some cases, active switching of dedicated amplifiers is used to selectively address productive nano-electronic measurement devices having a single nanotube and single biomolecule (e.g. polymerase complex). In some preferred aspects, nano-electronic measurement devices of the invention are produced using carbon nanotubes in combination with CMOS electronics. Sparse amplifier arrays are described, for example in U.S. Patent Application No. 2017/024,017 which is incorporated herein by reference for all purposes.

Nucleotide analogs comprising charge labels can be used for electronic sequencing. These analogs can include, for example, nucleotide analogs describe in U.S. Pat. No. 9,062,091 entitled Polymerase Enzyme Substrates with Protein Shield, and in U.S. patent application Ser. No. 14/452,497, entitled Protected Fluorescent Reagent Compounds, filed Aug. 5, 2014 which are incorporated herein by reference for all purposes.

In some cases the charge labels comprise beads, for example beads comprising multiple nucleotides attached via their polyphosphate portion. Such analogs are described, for example in U.S. Pat. No. 8,367,813 which is incorporated by reference herein in its entirety for all purposes. The beads can be coated with charged functional groups, anionic, cationic, or a combination of anionic and cationic groups. The amount of charge on the bead can be controlled in order to control the electrical signal at the gate of the nanoFET. The beads can have any usable size range, for example, between about 2 nm and about 50 nm in size. The shapes of the beads can be spherical, elongated, or other effective shape for controlling the current at the gate of the nanoFET.

Methods for making and addressing nano-electronic measurement devices including nanoFETs comprising nanowires are known in the art. See, for example, Choi et al. "Single-Molecule Lysozyme Dynamics Monitored by an Electronic Circuit" Science 335, 319 (2012), and Patolsky et al., "Electrical Detection of Viruses," PNAS, 101(39), 14017, 2004 which are incorporated herein by reference in their entirety for all purposes.

Nucleotide analogs can also be differentiated by their impedance versus frequency characteristics. The measured impedance of a label will also be highly dependent on the frequency. It is well known that the components that contribute to impedance in a given system can vary significantly with frequency, for example ionic motion can predominate at some frequencies and dipolar contributions can predominate at other frequencies. Measurements of this type are sometimes referred to as impedance spectroscopy or dielectric spectroscopy measurements. See e.g. Barsoukov, et al. "Impedance Spectroscopy: Theory, Experiment, and Applications", Wiley, 2005, and Kremer et al. "Broadband dielectric spectroscopy", Springer, 2003, the contents of which are incorporated herein by reference for all purposes. Different labels exhibit different impedance versus frequency characteristics, and these characteristics can be used to provide distinct labels and to increase the confidence in base calling.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually and separately indicated to be incorporated by reference for all purposes.

What is claimed is:

1. An integrated active pixel circuit comprising:
    a substrate;
    a positive supply voltage line ($V_{DD}$);
    a first reset line;
    a second reset line;
    a first signal line;
    a second signal line;
    a storage A control element in electrical communication with the positive supply voltage line and the first reset line, wherein an electrical property of the first reset line determines whether the storage A control element is in an electrically isolating or an electrically communicating state;
    a storage B control element in electrical communication with the positive supply voltage line and the second reset line, wherein an electrical property of the second reset line determines whether the storage B control element is in an electrically isolating or an electrically communicating state; and
    a plurality of pixels arranged on the substrate;
    wherein, each respective pixel in the plurality of pixels comprises:
        a storage element A in electrical communication with the storage A control element, wherein the storage element A is reset when in electrical communication with the positive supply voltage line through the storage A control element when the storage A control element is in the electrically communicating state;
        a storage element B in electrical communication with the storage B control element, wherein the storage element B is reset when in electrical communication with the positive supply voltage line through the storage B control element when the storage B control element is in the electrically communicating state;
        a sensor that is reset when set to the voltage of the positive supply voltage line, wherein the sensor measures a property;
        a first sensor control element in electrical communication with (i) the storage A element (ii) the first signal line, and (iii) the respective pixel, wherein an electrical property of the first signal line determines whether the first sensor control element electrically isolates the sensor from the storage element A or electrically connects the sensor to the storage element A, and wherein the storage A element is connected to the respective pixel through the first sensor control element;
        a second sensor control element in electrical communication with (i) the storage B element (ii) the second signal line, and (iii) the respective pixel, wherein an electrical property of the second signal line determines whether the second sensor control element electrically isolates the sensor from the storage element B or electrically connects the sensor to the storage element B, and wherein the storage B element is connected to the respective pixel through the second sensor control element;
        a first output line in electrical communication with the storage element A; and
        a second output line in electrical communication with the storage element B.

2. The integrated active pixel circuit of claim 1, further comprising:
    a controller that defines a plurality of sequential frame pairs, wherein
        the controller is in electrical communication with the first reset line, the second reset line, the first signal line, and the second signal line;
        wherein for each first frame in a respective frame pair in the plurality of frame pairs:

the controller sets the electrical property of the first reset line so that the storage A control element is in the electrically isolating state;

the controller sets the electrical property of the first signal line so that the first sensor control element electrically connects the sensor to the storage element A;

the controller sets the electrical property of the second signal line so that the second sensor control element electrically isolates the sensor from the storage element B;

wherein for each second frame in a respective frame pair in the plurality of frame pairs:

the controller sets the electrical property of the second reset line so that the storage B control element is in the electrically isolating state;

the controller sets the electrical property of the first signal line so that the first sensor control element electrically isolates the sensor from the storage element A; and the controller sets the electrical property of the second signal line so that the second sensor control element electrically connects the sensor to the storage element B.

3. The integrated active pixel circuit of claim 2, wherein before each first frame the controller resets the sensor and the storage element A by:

setting the electrical property of the first reset line so that the storage A control element is in the electrically communicating state; and setting the electrical property of the first signal line so that the first sensor control element electrically connects the sensor to the storage element A;

before each second frame the controller resets the sensor and the storage element B by:

setting the electrical property of the second reset line so that the storage B control element is in the electrically communicating state; and setting the electrical property of the second signal line so that the second sensor control element electrically connects the sensor to the storage element B.

4. The integrated active pixel circuit of claim 1, further comprising, for each pixel in the plurality of pixels:

a signal comparator in electrical communication with the first and second output line, and a signal comparator output line that provides a differential comparison of the first and second output line.

5. The integrated active pixel circuit of claim 1, wherein the sensor comprises a CMOS sensor.

6. The integrated active pixel circuit of claim 1, wherein the property comprises light impinging on the sensor.

7. The integrated active pixel circuit of claim 1, wherein the property comprises pressure, temperature, position, vibration, humidity, chemical species, or a fluid property.

8. The integrated active pixel circuit of claim 4, wherein the signal comparator is a differential amplifier.

9. The integrated active pixel circuit of claim 4, further comprising column circuitry in electrical communication with the signal comparator output line.

10. The integrated active pixel circuit of claim 9, wherein the column circuitry comprises an analog to digital converter.

11. The integrated active pixel circuit of claim 1, wherein
the integrated active pixel circuit is CMOS;
the sensor is a photodiode;
the property is light impinging on the sensor;
the storage element A is a first capacitor; and
the storage element B is a second capacitor.

12. The integrated active pixel circuit of claim 1, wherein the sensor represents the light in the form of a voltage.

13. The integrated active pixel circuit of claim 12, wherein the signal comparator provides to the signal comparator line a difference in voltage between the first and second output line.

14. The integrated active pixel circuit of claim 1, wherein each pixel in the plurality of pixels includes a separate storage A control element and a storage B control element.

15. The integrated active pixel circuit of claim 1, the storage A control element and the storage B control element are external to the plurality of pixels.

* * * * *